(12) United States Patent
Kim

(10) Patent No.: US 10,506,221 B2
(45) Date of Patent: Dec. 10, 2019

(54) FIELD OF VIEW RENDERING CONTROL OF DIGITAL CONTENT

(71) Applicant: Adobe Inc., San Jose, CA (US)

(72) Inventor: Byungmoon Kim, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/227,300

(22) Filed: Aug. 3, 2016

(65) Prior Publication Data

US 2018/0041750 A1 Feb. 8, 2018

(51) Int. Cl.
| | | |
|---|---|---|
| H04N 13/344 | (2018.01) | |
| G06K 9/62 | (2006.01) | |
| G06T 15/20 | (2011.01) | |
| G06F 1/16 | (2006.01) | |
| G06F 3/01 | (2006.01) | |

(52) U.S. Cl.
CPC .......... *H04N 13/344* (2018.05); *G06F 1/163* (2013.01); *G06F 3/011* (2013.01); *G06K 9/6267* (2013.01); *G06T 15/20* (2013.01)

(58) Field of Classification Search
CPC ....... G06F 1/163; G06F 3/011; G06K 9/6267; G06T 15/20; H04N 13/344
See application file for complete search history.

(56) References Cited

U.S. PATENT DOCUMENTS

| | | |
|---|---|---|
| 7,893,935 B1 | 2/2011 | Neely et al. |
| 8,217,856 B1 | 7/2012 | Petrou |
| 8,303,387 B2 | 11/2012 | Spivack |
| 8,312,552 B1 | 11/2012 | Hadden et al. |
| 8,745,494 B2 | 6/2014 | Spivack |
| 8,799,810 B1 | 8/2014 | Wheeler |
| 8,825,081 B2 | 9/2014 | Arrasvuori et al. |
| 8,866,847 B2 | 10/2014 | Bedi et al. |
| 9,058,790 B2 | 6/2015 | Kato |
| 9,147,208 B1 | 9/2015 | Argue et al. |
| 9,729,864 B2 | 8/2017 | Stafford |
| 10,068,378 B2 | 9/2018 | Cabanier et al. |
| 10,198,846 B2 | 2/2019 | Carr |
| 10,430,559 B2 | 10/2019 | Anantharaman |
| 2008/0004950 A1 | 1/2008 | Huang et al. |
| 2009/0037822 A1 | 2/2009 | Kandekar et al. |

(Continued)

OTHER PUBLICATIONS

"Non-Final Office Action", U.S. Appl. No. 15/244,656, dated Jun. 14, 2017, 29 pages.

(Continued)

*Primary Examiner* — Francis Geroleo
(74) *Attorney, Agent, or Firm* — SBMC

(57) ABSTRACT

Techniques and system to control rendering of digital content according as having respective fields of view are described. In one example, metadata is used to assign a first field of view to be used for rendering of a first group of frames of the plurality of frames of the digital content and a second field of view to be used for rendering of a second group of frames of the plurality of frames of the digital content. Metadata is assigned to the digital content to control rendering of the first group of frames as having the first field of view and the second group of frames as having the second field of view. This metadata may then be used to control rendering of the digital content, an example of which is further described in the following.

20 Claims, 8 Drawing Sheets

(56) References Cited

U.S. PATENT DOCUMENTS

| | | | |
|---|---|---|---|
| 2009/0048908 | A1 | 2/2009 | Kaplan et al. |
| 2009/0087024 | A1* | 4/2009 | Eaton ............... G06K 9/00335 |
| | | | 382/103 |
| 2009/0094518 | A1 | 4/2009 | Lawther et al. |
| 2010/0082436 | A1 | 4/2010 | Maghoul et al. |
| 2010/0226535 | A1 | 9/2010 | Kimchi et al. |
| 2011/0258049 | A1 | 10/2011 | Ramer et al. |
| 2011/0283223 | A1 | 11/2011 | Vaittinen et al. |
| 2012/0030227 | A1 | 2/2012 | Mital et al. |
| 2012/0140027 | A1 | 6/2012 | Curtis et al. |
| 2012/0272179 | A1 | 10/2012 | Stafford |
| 2013/0044912 | A1 | 2/2013 | Kulkarni et al. |
| 2013/0050258 | A1 | 2/2013 | Liu et al. |
| 2013/0236161 | A1 | 9/2013 | Takeda |
| 2013/0258138 | A1 | 10/2013 | Ma et al. |
| 2013/0307875 | A1 | 11/2013 | Anderson |
| 2014/0195968 | A1 | 7/2014 | Banavara |
| 2014/0268356 | A1* | 9/2014 | Bolas ............... G02B 27/0093 |
| | | | 359/630 |
| 2014/0333664 | A1 | 11/2014 | Williams et al. |
| 2015/0058347 | A1 | 2/2015 | Russek |
| 2015/0063661 | A1 | 3/2015 | Lee et al. |
| 2015/0081604 | A1 | 3/2015 | Duque et al. |
| 2015/0120648 | A1 | 4/2015 | Slovacek |
| 2015/0213058 | A1 | 7/2015 | Ambardekar et al. |
| 2015/0220802 | A1 | 8/2015 | Mazur et al. |
| 2015/0227795 | A1 | 8/2015 | Starner et al. |
| 2015/0234796 | A1 | 8/2015 | Williams et al. |
| 2015/0243078 | A1 | 8/2015 | Watson et al. |
| 2015/0254892 | A1 | 9/2015 | Smith et al. |
| 2015/0324698 | A1 | 11/2015 | Karaoguz et al. |
| 2015/0348322 | A1 | 12/2015 | Ligameri et al. |
| 2016/0027214 | A1 | 1/2016 | Memmott et al. |
| 2016/0055201 | A1 | 2/2016 | Poupyrev et al. |
| 2016/0093105 | A1 | 3/2016 | Rimon et al. |
| 2016/0112667 | A1* | 4/2016 | Park ............... G06F 1/1601 |
| | | | 348/739 |
| 2016/0133052 | A1 | 5/2016 | Choi et al. |
| 2016/0343107 | A1* | 11/2016 | Newman ............... G06T 3/00 |
| 2016/0364916 | A1 | 12/2016 | Terahata |
| 2017/0026577 | A1* | 1/2017 | You ............... G06F 3/167 |
| 2017/0061696 | A1 | 3/2017 | Li et al. |
| 2017/0064374 | A1 | 3/2017 | Eim et al. |
| 2017/0153698 | A1 | 6/2017 | Bamidele et al. |
| 2017/0160815 | A1 | 6/2017 | Glazier et al. |
| 2017/0163839 | A1 | 6/2017 | Arana et al. |
| 2017/0201808 | A1 | 7/2017 | Chowdhary et al. |
| 2017/0266554 | A1 | 9/2017 | Marks et al. |
| 2017/0269685 | A1 | 9/2017 | Marks et al. |
| 2017/0269713 | A1 | 9/2017 | Marks et al. |
| 2017/0277256 | A1 | 9/2017 | Burns et al. |
| 2017/0372401 | A1 | 12/2017 | Wang et al. |
| 2018/0005443 | A1 | 1/2018 | Poulos et al. |
| 2018/0039479 | A1 | 2/2018 | Fransen et al. |
| 2018/0046363 | A1 | 2/2018 | Miller et al. |
| 2018/0053236 | A1 | 2/2018 | Fransen et al. |
| 2018/0053333 | A1 | 2/2018 | Carr |
| 2018/0059898 | A1 | 3/2018 | Miller et al. |
| 2018/0061128 | A1 | 3/2018 | Cabanier et al. |
| 2018/0075655 | A1 | 3/2018 | Cabanier et al. |
| 2018/0107805 | A1 | 4/2018 | Anantharaman |
| 2018/0188801 | A1 | 7/2018 | Leppanen et al. |
| 2018/0330548 | A1 | 11/2018 | Cabanier et al. |

OTHER PUBLICATIONS

"Pre-Interview Communication", U.S. Appl. No. 15/262,616, dated Sep. 21, 2017, 3 pages.
"First Action Interview Office Action", U.S. Appl. No. 15/262,616, dated Nov. 2, 2017, 3 pages.
"Final Office Action", U.S. Appl. No. 15/244,656, dated Sep. 21, 2017, 48 pages.
"PAVR Creates Emmy Award-Winning 360-Degree Video for FOX Sports", The Creative Cloud Team—Retrieved at: http://blogs.adobe.com/creativecloud/pavr-creates-emmy-award-winning-360-degree-video-for-fox-sports/, Jul. 13, 2016, 3 pages.
Chuang,"Animating Pictures with Stochastic Motion Textures", ACM Transactions on Graphics, vol. 24, No. 3, to appear, (Proceedings of ACM SIGGRAPH 2005, Jul. 2005, Los Angeles), Jul. 2005, 8 pages.
Conner-Simons,"Reach in and Touch Objects in Videos with "Interactive Dynamic Video"", Retrieved at: https://www.csail.mit.edu/reach_in_and_touch_objects_in_videos_with%20_interactive_dynamic_video, Aug. 2, 2016, 3 pages.
Lumb,"New MIT tech lets you mess with objects in pre-recorded video—Yes, they've already successfully tested it in 'Pokémon Go.'", Retrieved at: https://www.engadget.com/2016/08/03/new-mit-tech-lets-you-mess-with-objects-in-pre-recorded-video/, Aug. 3, 2016, 2 pages.
"Augmented Reality & Visual Discovery Solutions | Blippar", Retrieved at: https://blippar.com/en/—on Aug. 22, 2016, 10 pages.
"Final Office Action", U.S. Appl. No. 15/243,130, dated Apr. 18, 2018, 14 pages.
"Notice of Allowance", U.S. Appl. No. 15/262,616, dated Apr. 27, 2018, 14 pages.
Dailey,"EMPATH: A Neural Network that Categorizes Facial Expressions", Journal of cognitive neuroscience 14.8, 2002, pp. 1158-1173.
"Pre-Interview Communication", U.S. Appl. No. 15/243,130, dated Dec. 8, 2017, 16 pages.
"Non-Final Office Action", U.S. Appl. No. 15/297,032, dated Dec. 1, 2017, 17 pages.
Fei-Fei,"A Bayesian Hierarchical Model for Learning Natural Scene Categories", Computer Vision and Pattern Recognition, 2005, 8 pages.
"Advisory Action", U.S. Appl. No. 15/297,032, dated Aug. 1, 2018, 5 pages.
"Blippar: Augmented Reality App Turns Everyday Products into Interactive Experience", Business NewsDaily, https://www.businessnewsdaily.com/5627-blippar-app.html, Dec. 16, 2013, 3 pages.
"Final Office Action", U.S. Appl. No. 15/297,032, dated Aug. 16, 2018, 17 pages.
"First Action Interview Office Action", U.S. Appl. No. 15/233,532, dated Aug. 28, 2018, 4 pages.
"Non-Final Office Action", U.S. Appl. No. 15/246,137, dated Sep. 10, 2018, 20 pages.
"Pre-Interview First Office Action", U.S. Appl. No. 15/246,137, dated Sep. 21, 2018, 5 pages.
"Corrected Notice of Allowance", U.S. Appl. No. 15/262,616, dated May 8, 2018, 11 pages.
"First Action Interview Office Action", U.S. Appl. No. 15/228,680, dated Jul. 5, 2018, 11 pages.
"Non-Final Office Action", U.S. Appl. No. 15/244,656, dated Jun. 28, 2018, 70 pages.
"Pre-Interview Communication", U.S. Appl. No. 15/228,680, dated May 17, 2018, 11 pages.
"Pre-Interview First Office Action", U.S. Appl. No. 15/233,532, dated Jun. 1, 2018, 4 pages.
"Restriction Requirement", U.S. Appl. No. 15/246,137, dated Jul. 20, 2018, 6 pages.
"Notice of Allowance", U.S. Appl. No. 15/243,130, dated Oct. 24, 2018, 13 pages.
"Final Office Action", U.S. Appl. No. 15/233,532, dated Nov. 1, 2018, 29 pages.
"Final Office Action", U.S. Appl. No. 15/228,680, dated Oct. 12, 2018, 52 pages.
"First Action Interview Office Action", U.S. Appl. No. 15/246,137, dated Dec. 6, 2018, 3 pages.
"Final Office Action", U.S. Appl. No. 15/244,656, dated Jan. 28, 2019, 62 pages.
"Final Office Action", U.S. Appl. No. 15/246,137, dated May 3, 2019, 23 pages.
"Non-Final Office Action", U.S. Appl. No. 15/228,680, dated Jun. 11, 2019, 61 pages.

(56) References Cited

OTHER PUBLICATIONS

"Notice of Allowance", U.S. Appl. No. 15/297,032, dated May 22, 2019, 16 pages.
"Restriction Requirement", U.S. Appl. No. 15/238,374, dated May 24, 2019, 7 pages.
"First Action Interview Office Action", U.S. Appl. No. 16/045,259, dated Sep. 4, 2019, 3 pages.
"Non-Final Office Action", U.S. Appl. No. 15/233,532, dated Aug. 8, 2019, 37 pages.
"Non-Final Office Action", U.S. Appl. No. 15/238,374, dated Sep. 6, 2019, 29 pages.
"Non-Final Office Action", U.S. Appl. No. 15/246,137, dated Oct. 4, 2019, 32 pages.
"Notice of Allowance", U.S. Appl. No. 16/045,259, dated Sep. 17, 2019, 7 pages.
"Pre-Interview First Office Action", U.S. Appl. No. 15/238,374, dated Sep. 16, 2019, 31 pages.
"Pre-Interview First Office Action", U.S. Appl. No. 16/045,259, dated Jul. 30, 2019, 3 pages.

\* cited by examiner

FIELD OF VIEW RENDERING CONTROL OF DIGITAL CONTENT

BACKGROUND

Conventional techniques used to render and view digital content are limited by both how digital content is captured as well as the devices used to display the content. One example of this is that conventional digital content is captured to have a single fixed field of view when rendered. A field of view, when referring to digital content rendering in the following, refers to an angular amount of a user's environment that is consumed in rendering of the digital content.

Conventionally, the field of view, also referred to an angle of view, is limited to an angular extent of a given scene that is imaged by a camera. This angular extent of the given scene is then rendered, conventionally, by a display device having a fixed amount of display area. Accordingly, the angular extent of the scene that is captured by the camera in forming the digital content also limits the display of the digital content to a display area that is made available using conventional display devices. As such, a field of view used to render the digital content using these conventional techniques remains fixed.

Cinematic techniques may be used to address these limitations, e.g., through panning and magnification. For example, panning and magnification may be used to alternate between feelings of intimacy or expansiveness when viewing indoor outdoor scenes in the digital content, respectively. However, these conventional cinematic techniques are still limited by the available display area of the display device used to render the digital content such that a field of view of the digital content, when rendered, does not change. For example, in conventional techniques that involve alternating between feelings of intimacy or expansiveness when viewing indoor outdoor scenes in the digital content, the rendered frames consume the same amount of a display area of the display device. Accordingly, a user's field of view when watching these scenes does not change.

Techniques have subsequently been developed to support an expanded field of view when compared to conventional display devices above, e.g., such that a user may be exposed to immersive digital content that appears to surround the user in augmented and virtual reality scenarios. The user, for instance, may wear a head mounted computing device that includes display devices that support a stereoscopic display. From this, a user may be immersed within an environment formed by the digital content that appears to surround the user, even to the point at which the rendering of the digital content consumes nearly an entirely of a field of view that may be viewed by a human eye, e.g., 180 degrees.

Conventional techniques that have been used to render digital content in these scenarios, however, are limited to recreation of a conventional viewing experience having a fixed field of view. A user viewing a movie within a virtual reality environment, for instance, within a conventional system, is typically exposed to a virtual movie theater in which the digital content is then rendered on a virtual movie screen having a fixed size. Consequently, this rendering of the digital content is limited to conventional cinematic techniques and ignores the potential of the expanded field of view of subsequently developed display devices.

SUMMARY

Techniques and system to control rendering of digital content according as having respective fields of view are described. In one example, metadata is used to assign a first field of view to be used for rendering of a first group of frames of the plurality of frames of the digital content and a second field of view to be used for rendering of a second group of frames of the plurality of frames of the digital content. This may be performed based on user inputs or automatically and without user intervention through detection of scene transitions and machine learning classification.

Metadata is assigned to the digital content to control rendering of the first group of frames as having the first field of view and the second group of frames as having the second field of view. The metadata may be assigned to individual frames (e.g., as part of headers), included within headers at the scene transitions, stored with segments that are fetched based on a manifest file in which each segment has a respective single field of view, and so forth. This metadata may then be used to control rendering of the digital content, an example of which is further described in the following.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
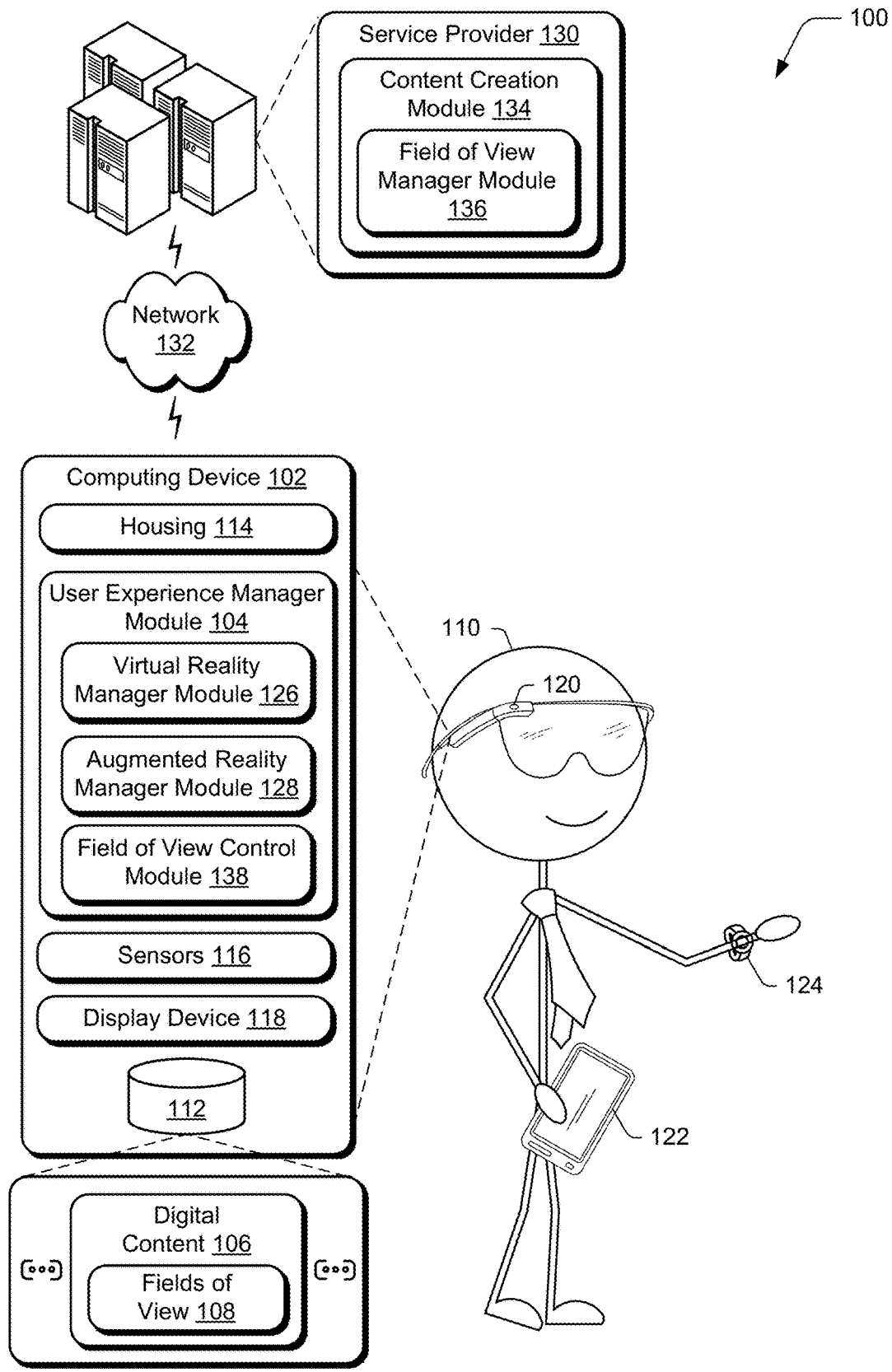
FIG. 1 is an illustration of an environment in an example implementation that is operable to employ techniques described herein.

Techniques and systems are described to control fields of view used to render digital content. A field of view, when referring to digital content rendering in the following, refers to an angular amount of a user's environment that is consumed in rendering of the digital content. A human eye of a user, for instance, typically has a field of view of approximately 180 degrees along a single plane at any one time in real life when viewing a physical environment. A user's physical environment, on the other hand, involves 360 degrees. Thus, the user typically moves eyes, a head, and even the body as a whole to view different part of this 360-degree physical environment.

Head-mounted computing devices have been developed to include stereoscopic display devices to approximate and even reach the user's field of view. One use of this is to immerse the user within an environment of the digital content when rendered. Digital content may also be rendered using these devices in a manner that consumes different angular amounts that are viewable by the user, e.g., from 360 degrees, 180 degrees, flat planes, and so forth. In other words, these computing devices may change an amount of a user's environment (e.g., virtually, augmented) that is consumed in the rendering of the digital content.

However, conventional techniques to render digital content, such as video, are typically configured to mimic conventional viewing scenarios, e.g., television, mobile phones. In a conventional virtual environment, for instance, a movie is rendered within a virtual movie theater and as such cannot take advantage of changes in fields of view that have now been made available through use of these devices.

In one example, metadata is associated with digital content to control a field of view that is to be used to render a group of frames of digital content. A filmmaker, for instance, may employ a 360-degree camera to capture frames of digital content of an outdoor scene. To enable a viewer of the digital content to feel immersed within this digital content, metadata is associated with these frames, e.g., as part of a header, associated file, and so forth. This metadata is used as part of rendering such that when viewed using a head-mounted computing device a virtual environment having a field of view of 360 degrees is used for rendering these frames. In this way, the viewer may navigate (e.g., through head movement) through different portions of the digital content in a manner that consumes an entirety of the field of view of the device as if the viewer is "really there."

The filmmaker may then desire to transition to a view of two people having a conversation. To drive the viewer's focus toward this conversation, the filmmaker associates metadata to reduce a field of view used by frames when rendering the digital content as part of the viewer's environment. The reduced field of view, for instance, may be used to limit display of the frames as having a fixed field of view that is displayed regardless of where the viewer's head is turned. In this way, the filmmaker is able to control the viewer's interaction with the digital content through use of fields of view in a manner that is not possible using conventional display devices. Additional examples are described in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102 configured for use in augmented reality and/or virtual reality scenarios, which may be configured in a variety of ways.

Figure 8:
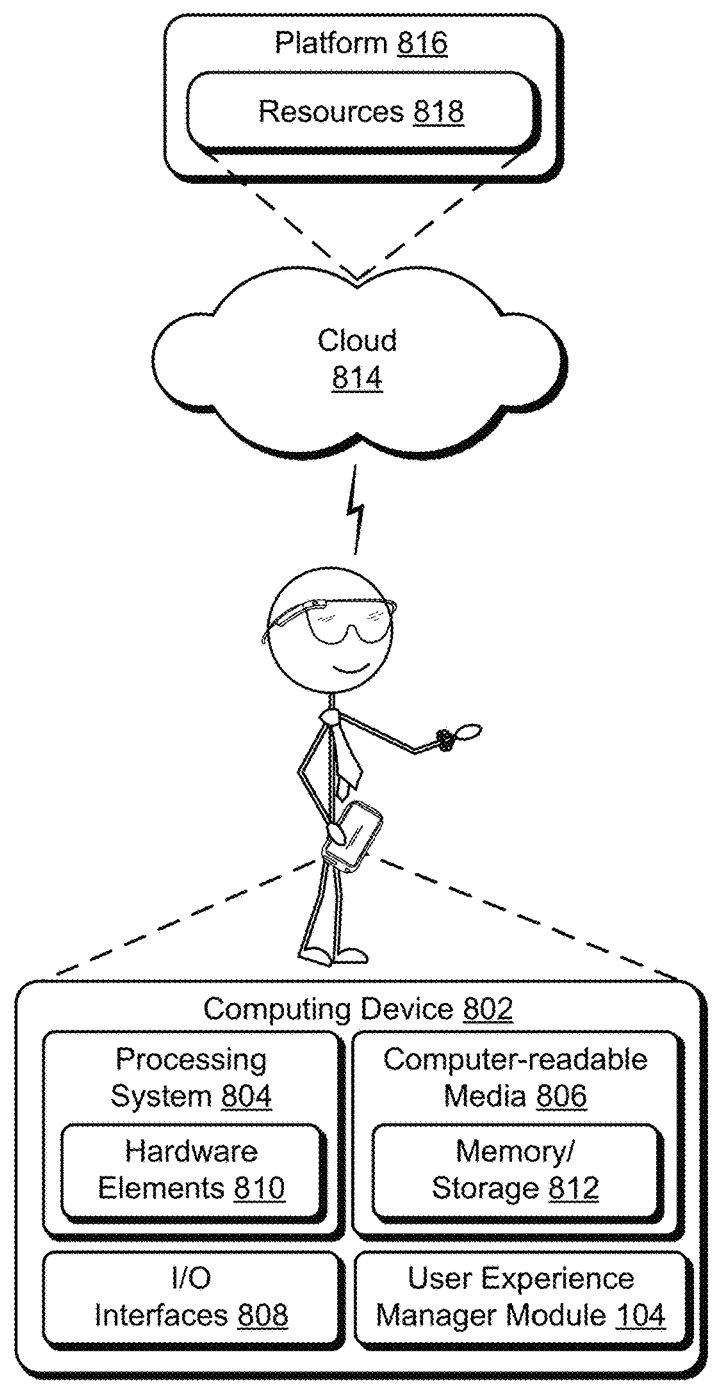
FIG. 8 illustrates an example system including various components of an example device that can be implemented as any type of computing device as described and/or utilize with reference to FIGS. 1-7 to implement embodiments of the techniques described herein.

The computing device 102 is illustrated as including a user experience manager module 104 that is implemented at least partially in hardware of the computing device 102, e.g., a processing system and memory of the computing device as further described in relation to FIG. 8. The user experience manager module 104 is configured to manage output of and user interaction with digital content 106 having different fields of view 108 that are made visible to a user 110. The digital content 106 is illustrated as maintained in storage 112 of the computing device 102.

The computing device 102 includes a housing 114, one or more sensors 116, and a display device 118. The housing 114 is configurable in a variety of ways to support interaction with the digital content 106. In one example, the housing 114 is configured to be worn on the head of a user 110 (i.e., is "head mounted" 120), such as through configuration as goggles, glasses, contact lens, and so forth. In another example, the housing 114 assumes a hand-held 122 form factor, such as a mobile phone, tablet, portable gaming device, and so on. In yet another example, the housing 114 assumes a wearable 124 form factor that is configured to be worn by the user 110, such as a watch, broach, pendant, or ring. Other configurations are also contemplated, such as configurations in which the computing device 102 is disposed in a physical environment apart from the user 110, e.g., as a "smart mirror," wall-mounted projector, television, and so on.

The sensors 116 may also be configured in a variety of ways to detect a variety of different conditions. In one example, the sensors 116 are configured to detect an orientation of the computing device 102 in three dimensional space, such as through use of accelerometers, magnetometers, inertial devices, radar devices, and so forth. In another example, the sensors 116 are configured to detect environmental conditions of a physical environment in which the computing device 102 is disposed, such as objects, distances to the objects, motion, colors, and so forth. A variety of sensor configurations may be used, such as cameras, radar devices, light detection sensors (e.g., IR and UV sensors), time of flight cameras, structured light grid arrays, barometric pressure, altimeters, temperature gauges, compasses, geographic positioning systems (e.g., GPS), and so forth. In a further example, the sensors 116 are configured to detect environmental conditions involving the user 110, e.g., heart rate, temperature, movement, and other biometrics.

The display device 118 is also configurable in a variety of ways to support the virtual user experience 106. Example of which include a typical display device found on a mobile device such as a camera or tablet computer, a light field display for use on a head mounted display in which a user may see through portions of the display, stereoscopic displays, projectors, and so forth. Other hardware components may also be included as part of the computing device 102, including devices configured to provide user feedback such as haptic responses, sounds, and so forth.

The housing 114, sensors 116, and display device 118 are also configurable to support different types of virtual user experiences by the user experience manager module 104. In one example, a virtual reality manager module 126 is employed to support virtual reality. In virtual reality, a user is exposed to an immersive environment, the viewable portions of which are entirely generated by the computing device 102. In other words, everything that is seen by the user 110 is rendered and displayed by the display device 118 through use of the virtual reality manager module 126 by rendering of the digital content 106.

The user, for instance, may be exposed to virtual objects as part of the digital content 106 that are not "really there" (e.g., virtual bricks) and are displayed for viewing by the user in an environment that also is completely computer generated. The computer-generated environment may also include representations of physical objects included in a physical environment of the user 110, e.g., a virtual table that is rendered for viewing by the user 110 to mimic an actual physical table in the environment detected using the sensors 116. On this virtual table, the virtual reality manager module 126 may also dispose virtual objects that are not physically located in the physical environment of the user 110, e.g., the virtual bricks as part of a virtual playset. In this way, although an entirely of the display being presented to the user 110 is computer generated, the virtual reality manager module 126 may represent physical objects as well virtual objects 108 within the display.

The user experience manager module 104 is also illustrated as supporting an augmented reality manager module 128. In augmented reality, the digital content 106 is used to augment a direct view of a physical environment of the user 110. The augmented reality manger module 128, for instance, may detect landmarks of the physical table disposed in the physical environment of the computing device 102 through use of the sensors 116, e.g., object recognition. Based on these landmarks, the augmented reality manager module 128 configures the digital content 106 to be viewed within this environment, e.g., as a virtual object of the virtual bricks to appear as is placed on the physical table.

The user 110, for instance, may view the actual physical environment through head-mounted 120 goggles. The head-mounted 120 goggles do not recreate portions of the physical environment as virtual representations as in the VR scenario above, but rather permit the user 110 to directly view the physical environment without recreating the environment. The digital content 106 is then displayed by the display device 118 to appear as disposed within this physical environment. Thus, in augmented reality the digital content 106 augments what is "actually seen" by the user 110 in the physical environment. In the following discussion, the digital content 106 may be rendered by the user experience manager module 104 in both a virtual reality scenario and an augmented reality scenario.

The environment 100 is further illustrated as including a service provider 130 that is accessible to the computing device 102 via a network 132, e.g., the Internet. The service provider 130 includes a content creation module 134 that is implemented at least partially in hardware of a computing device, e.g., one or more servers. The content creation module 134 is representative of functionality to create the digital content 106 to include different fields of view 108 through use of a field of view manager module 136. Accordingly, the digital content 106, when rendered through use of a field of view control module 138 by the computing device 102 of the user 110, may expose the digital content 106 to consume different angular amounts of an environment of the user 110, an example of which is further described in the following.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
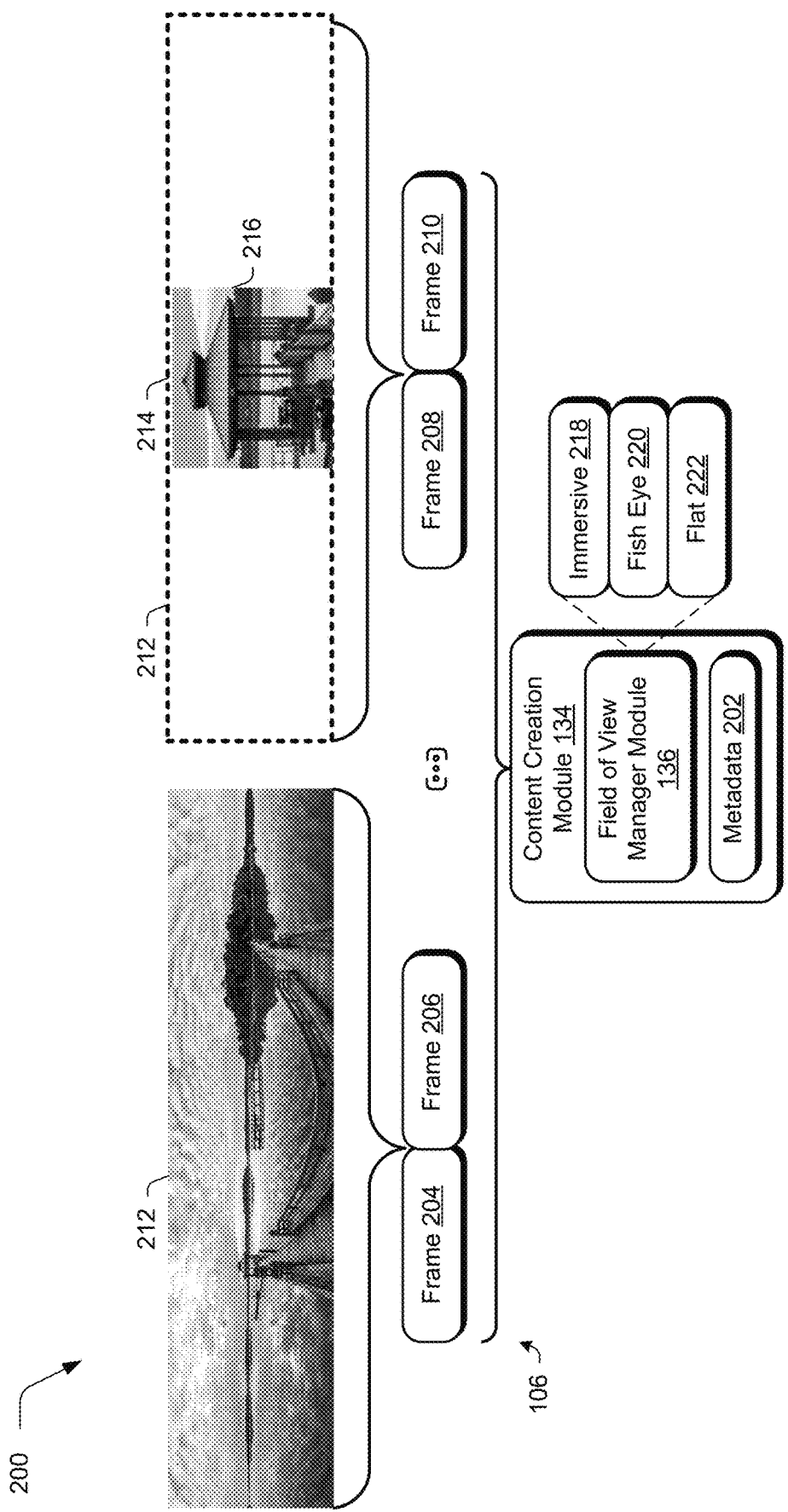
FIG. 2 depicts a system in an example implementation in which different fields of view to render the digital content are assigned as part of content creation.

FIG. 2 depicts a system 200 in an example implementation in which different fields of view to render the digital content 106 are assigned as part of content creation. The digital content 106 in this example includes a plurality of frames 202, 204, 206, 208. As part of creation of the digital content 106, fields of view are assigned to the frames 204, 206, 208, 210 to control how those frames are rendered for viewing by a user 110.

In this example, frames 204, 206 of the digital content 106 form a first grouping that is configured for rendering to support display of a 360-degree environment to the user 110, e.g., in a virtual reality scenario. Accordingly, each of the frames 204, 206 support an angular amount of a user's environment that is greater than an amount that is viewable by the user at any one time as further described in the following.

Figure 3:
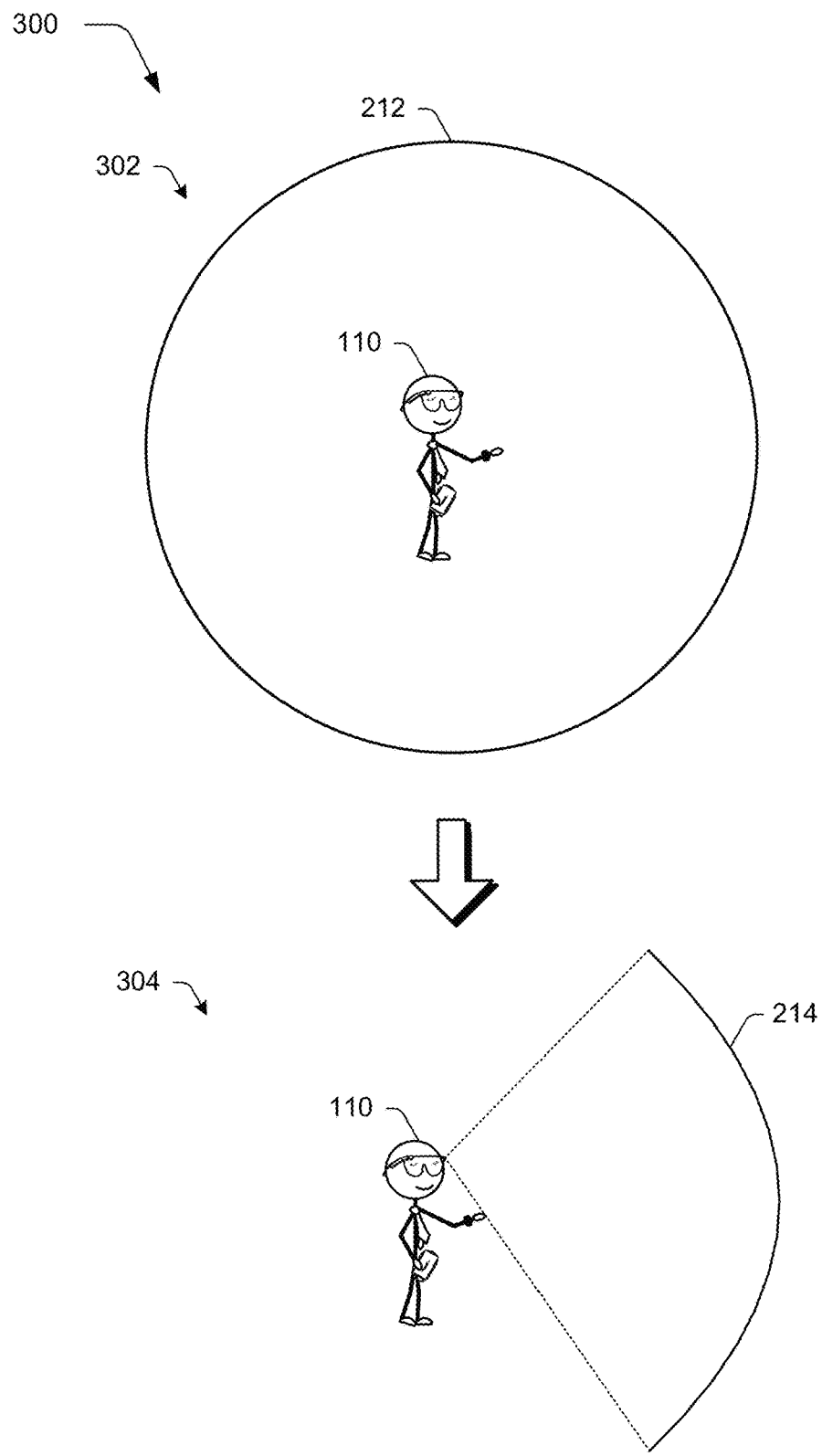
FIG. 3 depicts a system illustrating differences in the fields of view of FIG. 2 from a top/down view.

FIG. 3 depicts an example implementation 300 showing a comparison of fields of view of FIG. 2. As previously described, a field of view, when referring to digital content 106 rendering in the following, refers to an angular amount of a user's environment that is consumed in rendering of the digital content 106. This implementation is shown using first and second stages 302, 304 of respective fields of view from a top/down perspective.

At the first stage 302, the frames 204, 206 of FIG. 2 each support 360-degree view 212. The user 110, however, is incapable of viewing more than 180 degrees at any one time via the display device 118. Accordingly, in this example movement of the user's 110 head or other inputs (e.g., movement of the user as a whole, manual input device, and so forth) may be used to navigate between portions of the frames 204, 206, to look down different ends of the dock as shown in FIG. 2. In this way, the user 110 is immersed within a 360-degree rendering of the digital content 106 and is able to view different portions at any one time.

A second grouping formed by frames 208, 210, on the other hand, is configured for viewing in a reduced field of view 214 when rendered as part of a user's environment in comparison with the 360-degree view 212. Portions outside of the reduced field of view 214 may be grayed out, not displayed whatsoever, and so on.

A filmmaker, for instance, may then wish to focus in on a gazebo 216 from the 360-degree view 212. Accordingly, an angular amount of the 360-degree field of view 212 is reduced to less than 90 degrees as shown at the second stage 304 of FIG. 3. This may be performed in a variety of ways, such as through use of an incremental reduction of an angle defined by the field of view, magnification, and so forth.

Fields of view may be configured in a variety of ways. In one example the fields of view are defined solely on an angle of a user's environment used to render the digital content 106, e.g., 360 versus 180 degree views. In another example, the fields of view are also associated with corresponding resolutions, e.g., to increase resolution for a flat 222 field of view that mimics a conventional display device versus an immersive 218 field of view as described above. In a further example, differing amounts of magnification may also be defined, such as for a fish eye 220 field of view having greater magnification at a center of the view than at edges of the view. A variety of other examples are also contemplated.

In one or more implementations, the field of view control module 138 of the user experience manager module 104 also controls user navigation of the content. The field of view control module 138, for instance, may reduce and even eliminate an ability of the user 110 to navigate through the display of the digital content 106, e.g., via head turn, as indicated by metadata associated with the digital content 106 for particular fields of view. For instance, the reduced field of view 214 may be displayed regardless of which direction the user 110 looks. In this way, the filmmaker of the digital content 106 may use the field of view to focus the user 110 to a desired portion of the content, which is not possible using conventional techniques.

In one or more implementations, different resolutions (e.g., numbers of pixel per defined area) are used to support the different views. When in the 360-degree field of view 212, for instance, a lower number of pixels per defined display area may be used than when in the reduced field of view 214. This may be used to conserve processing and display resources of the computing device 102. In this way, a greater level of detail may be provided to a reduced view at which a user's attention is focused than in an immersive view that may involve an expanded field of view. These and other examples are described in the following in relation to corresponding systems and procedures.

Figure 4:
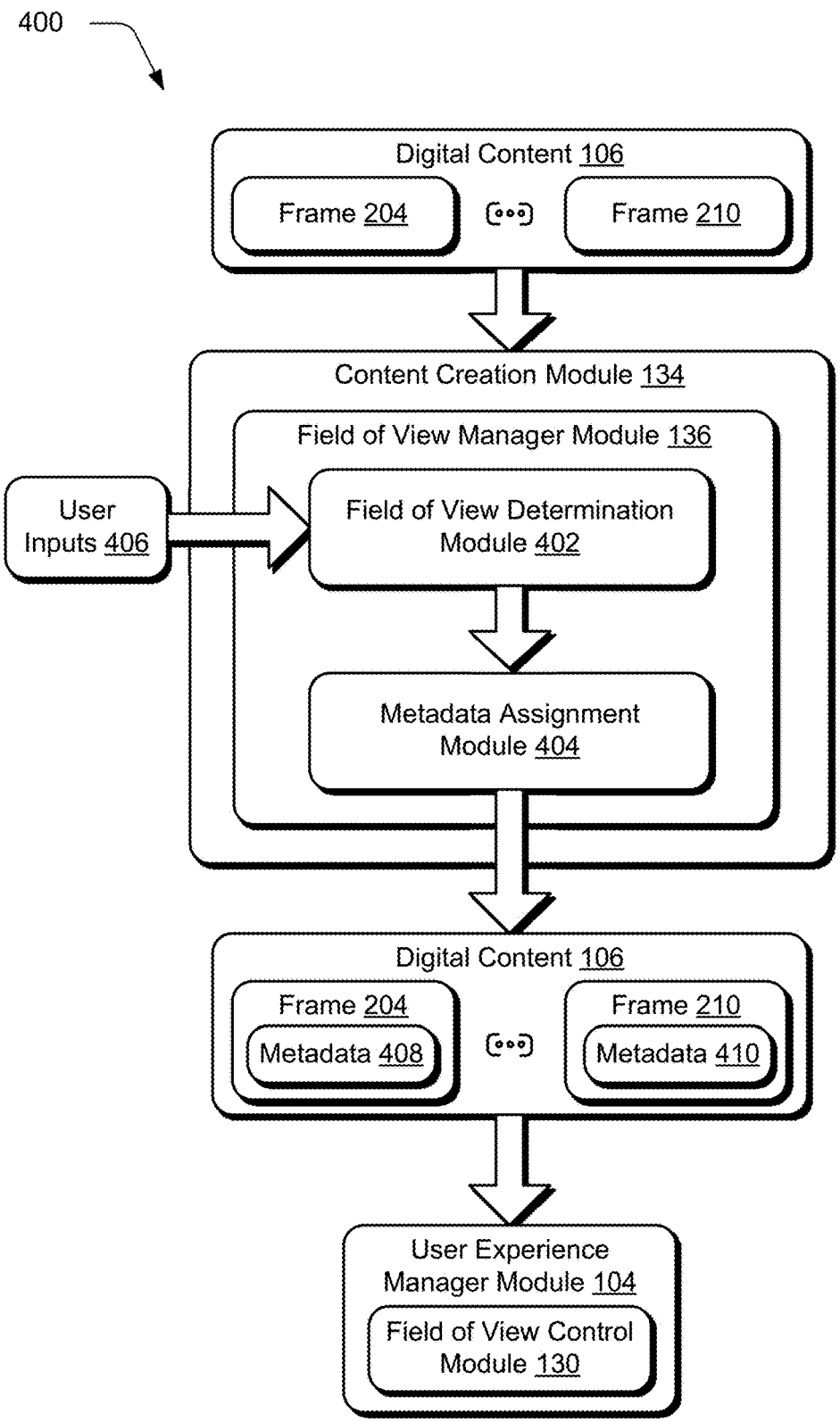
FIG. 4 depicts a system in an example implementation in which fields of view are assigned using metadata as part of creation of digital content.

FIG. 4 depicts a system 400 showing the content creation module 134 of FIG. 1 in greater detail in an example implementation in which fields of view are assigned using metadata as part of creation of digital content. The digital content 106 is received by the field of view manager module 136 of the content creation module 134. The digital content 106 includes a plurality of frames 204-210 as described in relation to FIG. 2.

The field of view manager module 136 is configured to assign a field of view to be used to render each of the frames 204, 208 of the digital content 106. To do so, the field of view manager module 136 employs a field of view determination module 402 and a metadata assignment module 404. The field of view determination module 402 is configured to determine which field of view is to be used for respective frames. This may be performed in a variety of ways, such as responsive to user inputs 406 received via user interaction with a user interface (e.g., from a filmmaker) or automatically and without user intervention by the service provide 102, an example of which is described in relation to FIG. 5.

In this illustrated example, a user interacts with a user interface. The user interface includes representations of frames in a manner that is similar to FIG. 2 such that the user may view what is captured in each frame. The user may then manually specify which fields of view are to be assigned to which frames, such as to assign an immersive 218 field of view to frames 204, 206 and a flat 222 field of view to frames 208, 210.

In response, a metadata assignment module 404 assigns metadata 408, 410 to respective frames 204, 210 that specifies the field of view to be used to render the respective frames. This may be performed in a variety of ways. In one example, a header of each of the frames 204, 210 includes the metadata 408, 410 that describes the field of view to be used. In another example, the metadata 408 is assigned at transition points in fields of view, e.g., for frames 204, 208 by not frames 206, 210. A variety of other examples are also contemplated, such as part of a file associated with the digital content 106 as part of a segment lookup such that segments (e.g., series of frames) obtained using lookup table are assigned to a respective field of view.

The digital content 106 and associated metadata 408, 410 are then communicated to a user experience manager module 104 of the computing device 102. The user experience manager module 104 is configured to render the digital content 106 using the field of view control module 130 to have a corresponding field of view as indicated by the metadata 408, 410. In this way, a creator of the digital content 106 may control fields of view used to expose that content, which support features of functionality not possible using conventional techniques.

Figure 5:
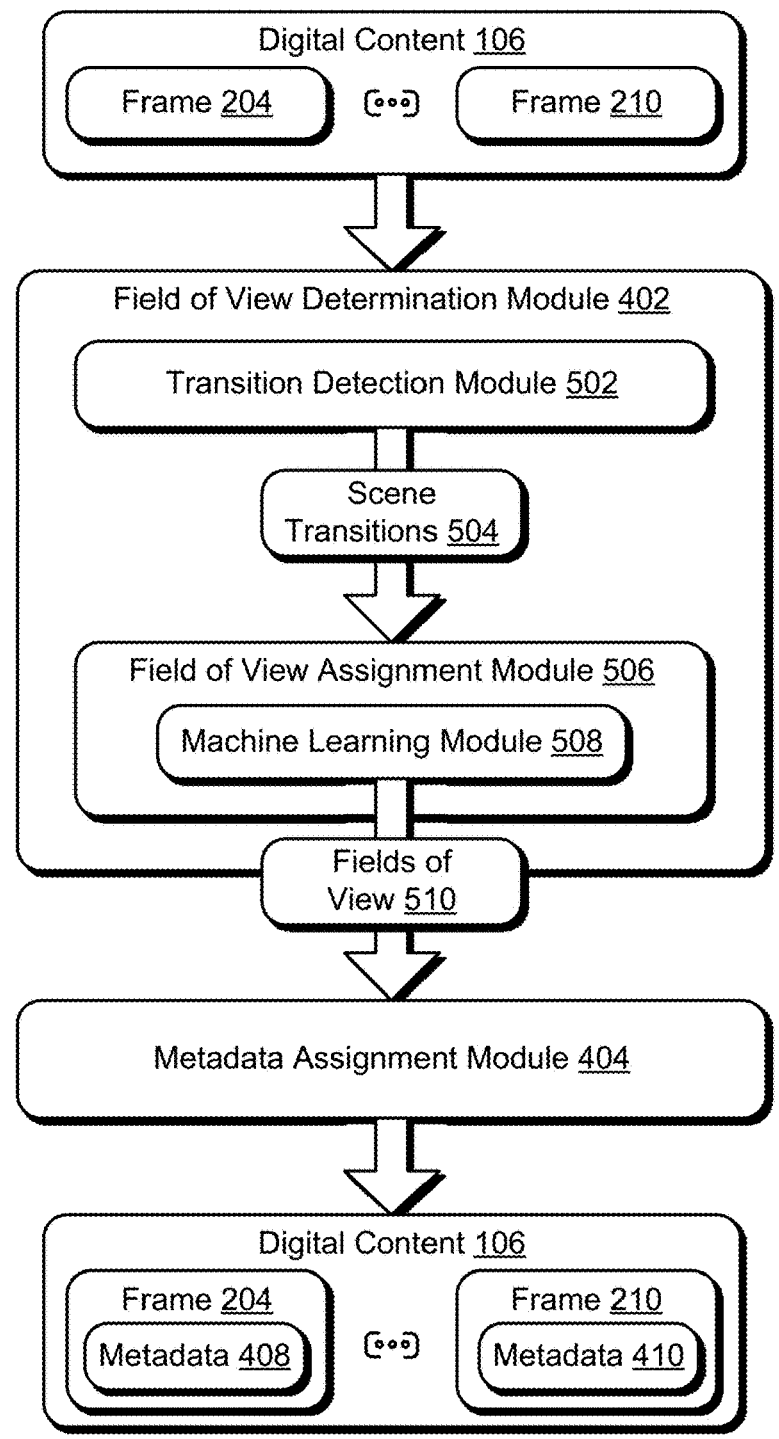
FIG. 5 depicts a system in an example implementation in which fields of view are assigned automatically and without user intervention by a display device using metadata as part of creation of digital content.

FIG. 5 depicts a system 500 in an example implementation in which fields of view are assigned automatically and without user intervention by a display device using metadata as part of creation of digital content. As before, digital content 106 having frames 204, 210 is received by the field of view determination module 402. First, a transition detection module 502 is used to detect scene transitions 504, in the frames 204, 210. This may be performed in a variety of ways automatically and without user intervention. In one example, the transition detection module 502 detects scene transitions 504 in sequences of frames having different visual contexts. This may be performed by computing a score that describes similarity of consecutive frames and using a threshold to determine if the frames are dissimilar enough as likely involving a scene transition 504.

The scene transitions are then provided to a field of view assignment module 506. The scene transitions 504 are first used to group the frames as likely involving similar visual contexts. A machine learning module 508 is then used to classify these groups, and from this classification assign fields of view 510 to respective groups. For example, the machine learning module 508 may be trained to classify outdoor scenes, headshots, user's conversing, action scenes, scenes involving minimal movement, and so forth. From these classifications, the field of view 510 may be assigned automatically and without user intervention, e.g., immersive 218 for outdoors and action scenes, flat 222 for user's conversing, headshots, and minimal movement, fish eye 220 for groups of people and urban street scenes, and so forth. The metadata assignment module 404 may then be employed to assign the metadata as previously described in relation to FIG. 4. A variety of other examples are also contemplated, such as to make a "first pass" using automation which is then adjusted by a user through interaction with a user interface. A variety of other examples are also contemplated, further discussion of which is included in the following section.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
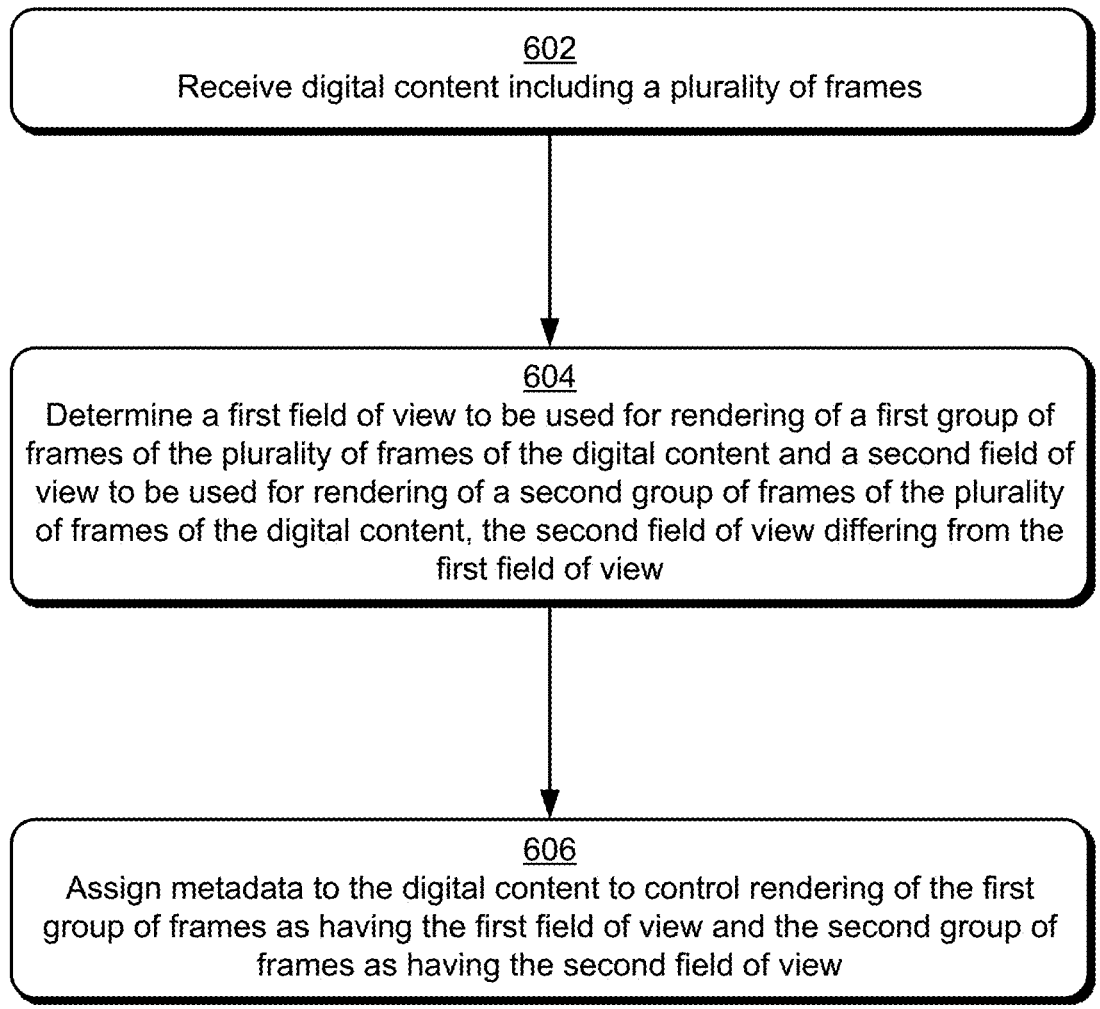
FIG. 6 is a flow diagram depicting a procedure in an example implementation in which fields of view are assigned using metadata as part of creation of digital content.

FIG. 6 depicts a procedure 600 in an example implementation in which fields of view are assigned using metadata as part of creation of digital content. Digital content is received that includes a plurality of frames (block 602). As previously described, the field of view manager module 136 may receive the digital content 106 from a variety of sources, such as stored locally on the computing device 102, remotely via a network 132, and so forth.

A determination is then made as to a first field of view to be used for rendering of a first group of frames of the plurality of frames of the digital content and a second field of view to be used for rendering of a second group of frames of the plurality of frames of the digital content, the second field of view differing from the first field of view (block 604). This may be performed in a variety of ways. In one example, the determination is based on user inputs as described in relation to FIG. 4. In another example, the determination is made automatically and without user intervention, such as based on scene transitions 504 and machine learning as described in relation to FIG. 5.

Metadata is assigned to the digital content to control rendering of the first group of frames as having the first field of view and the second group of frames as having the second field of view (block 606). The metadata may be assigned to individual frames (e.g., as part of headers), included within headers at the scene transitions 504, stored with segments that are fetched based on a manifest file in which each segment has a respective single field of view, and so forth. This metadata may then be used to control rendering of the digital content 106, an example of which is further described in the following.

Figure 7:
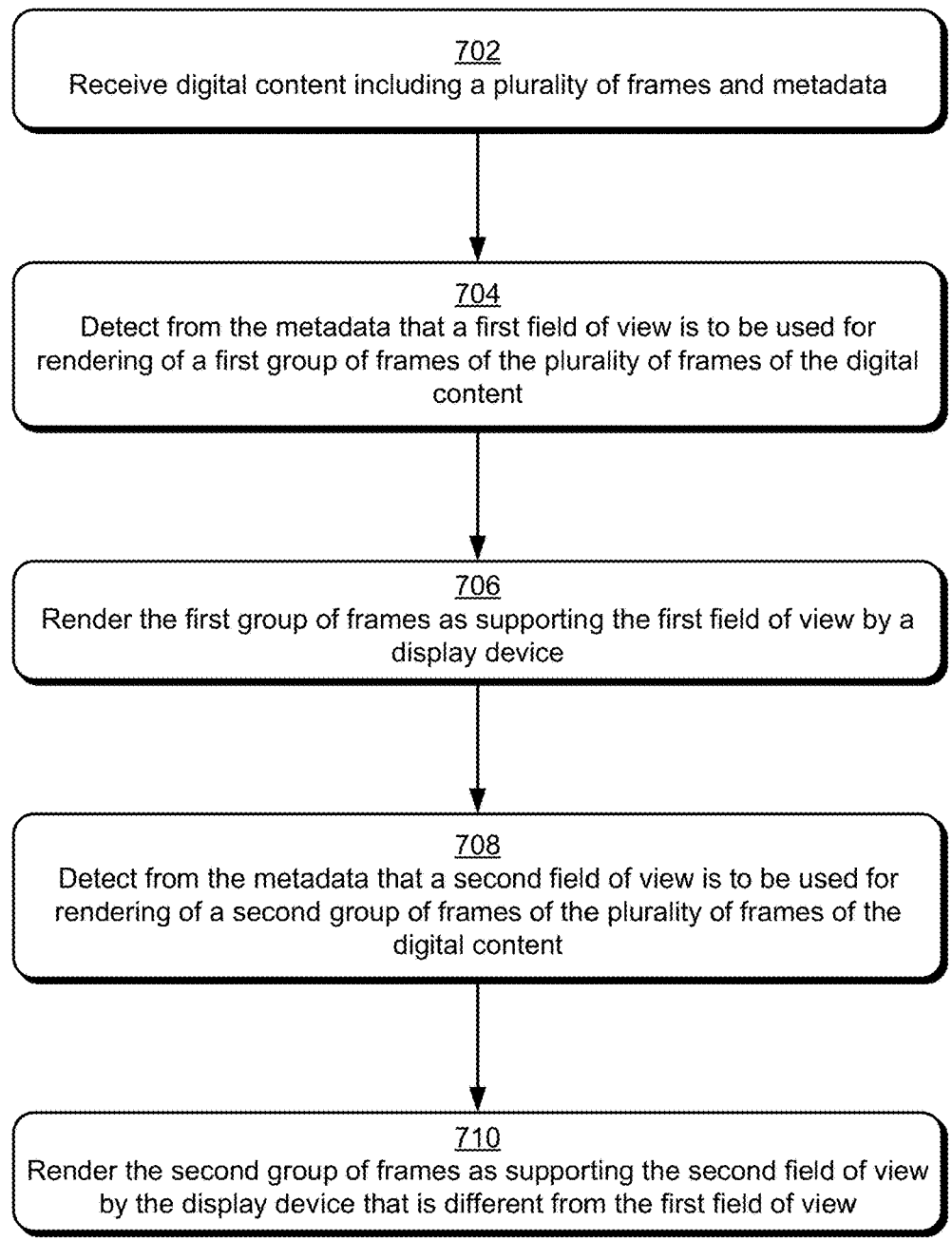
FIG. 7 is a flow diagram depicting a procedure in an example implementation in which fields of view assigned using metadata are used to control rendering of digital content.

FIG. 7 depicts a procedure 700 in an example implementation in which fields of view assigned using metadata are used to control rendering of digital content. Digital content is received that includes a plurality of frames and metadata (block 702). A user experience manager module 104 of the computing device 102, for instance, may receive the digital content 106 from storage that is local to the device, remote via the network 132, and so forth.

A first field of view is detected from the metadata. The first field of view is to be used for rendering of a first group of frames of the plurality of frames of the digital content (block 704). The first group of frames are then rendered as supporting the first field of view by a display device (block 706). A field of view control module 130 detects metadata referencing the first field of view and frames that are to be rendered based on this metadata. This may be performed for individual frames, between scene transitions, for segments formed form the groups, and so forth. The field of view control module 130, for instance, may detect metadata in a header at a scene transition in a sequence of frames and render those frames as having that field of view until metadata is detected that specified otherwise.

A second field of view is detected from the metadata. The second field of view is to be used for rendering of a second group of frames of the plurality of frames of the digital content (block 708). The second group of frames are then rendered as supporting the second field of view by a display device that is different from the first field of view (block 710). Continuing with the previous example, metadata may be used to specify fields of view for individual frames, a transition between groupings, and so forth. In this way, the user experience manager module 104 acts as a "media player" to render the digital content in a manner that is controlled based on metadata associated with the content.

Example System and Device

FIG. 8 illustrates an example system generally at 800 that includes an example computing device 802 that is representative of one or more computing systems and/or devices that may implement the various techniques described herein. This is illustrated through inclusion of the user experience manager module 104. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by at least one computing device, the method comprising:
   receiving, by the at least one computing device, digital content including a plurality of frames;
   computing, by the at least one computing device, a score that describes a similarity of a first group of frames of the plurality of frames to a second group of frames of the plurality of frames;
   detecting, by the at least one computing device, a scene transition from the first group of frames to the second group of frames responsive to determining that the score satisfies a dissimilarity threshold;
   assigning, by the at least one computing device using machine learning, a first field of view to the first group of frames, the first field of view to be used for rendering the first group of frames as having a first angular amount defining a first area of a display device that is made available for viewing;

assigning, by the at least one computing device using machine learning, a second field of view to the second group of frames, the second field of view to be used for rendering of the second group of frames having a second angular amount defining a second area of the display device that is made available for viewing, the second angular amount differing from the first angular amount and the second area differing from the first area; and assigning, by the at least one computing device, metadata to the digital content to control rendering of the first group of frames in the first area using the first field of view and the second group of frames in the second area using the second field of view.

2. The method as described in claim 1, wherein the first field of view differs from the second field of view by an angular extent of the display device that is made available for viewing by a user's eye by a display device.

3. The method as described in claim 1, wherein each frame of the first group of frames consumes a larger amount of display area of a display device when rendered than each frame of the second group of frames.

4. The method as described in claim 3, wherein the second group of frames have a higher resolution than the first group of frames.

5. The method as described in claim 1, wherein each frame of the first group of frames supports viewing, at least partially, when rendered using peripheral vision of a user whereas each frame of the second group of frames does not support viewing using peripheral vision of a user when rendered.

6. The method as described in claim 1, wherein each frame of the first group of frames is configured as immersive digital content and each frame of the second group of frames is not.

7. The method as described in claim 6, wherein the second group of frames are fixed and do not support user navigation.

8. The method as described in claim 1, further comprising classifying, by the at least one computing device, the first group of frames based on visual content of the first group of frames, wherein assigning the first field of view to the first group of frames is performed based on the classification.

9. The method as described in claim 1, further comprising classifying, by the at least one computing device, the second group of frames based on visual content of the second group of frames, wherein assigning the second field of view to the second group of frames is performed based on the classification.

10. In a digital medium environment to render digital content, a method implemented by at least one computing device, the method comprising:

receiving, by the at least one computing device, the digital content including a plurality of frames and metadata;

detecting, by the at least one computing device, from the metadata that a first field of view is to be used for rendering of a first group of frames of the plurality of frames of the digital content, the first field of view including a first angular amount defining a first area of a display of the computing device;

rendering, by the at least one computing device, the first group of frames using the first field of view, the first group of frames being configured as immersive digital content that supports user navigation;

detecting, by the at least one computing device, from the metadata that a second field of view is to be used for rendering of a second group of frames of the plurality of frames of the digital content, the second field of view including a second angular amount defining a second area of the display of the computing device, the second field of view comprising a portion of the first field of view; and rendering, by the at least one computing device, the second group of frames using the second field of view, the second group of frames being fixed as not supporting user navigation.

11. The method as described in claim 10, wherein the first field of view differs from the second field of view by an angular extent of the digital content that is made available for viewing by a user's eye by a display device.

12. The method as described in claim 10, wherein each frame of the first group of frames consumes a larger amount of display area of a display device when rendered than each frame of the second group of frames.

13. The method as described in claim 10, wherein each frame of the first group of frames supports viewing, at least partially, when rendered using peripheral vision of a user whereas each frame of the second group of frames does not support viewing using peripheral vision of a user when rendered.

14. The method as described in claim 10, wherein the second group of frames have a higher resolution than the first group of frames.

15. A computing device comprising:
a display device configured to render digital content in:
 a first field of view including a first angular amount defining a first area of the display device; and
 a second field of view including a second angular amount defining a second area of the display device, the second field of view comprising a portion of the first field of view;
a processing system configured to execute instructions; and
a computer-readable storage media including instructions stored thereon that, responsive to execution by the processing system, configures the processing system to perform operations comprising:
 determining by the at least one computing device:
  a first group of frames of a plurality of frames of the digital content to be rendered using the first field of view; and
  a second group of frames of the plurality of frames of the digital content to be rendered using the second field of view;
 rendering the first group of frames using the first angular amount of the display device in the first field of view, the first group of frames configured as immersive digital content that supports user navigation; and
 rendering the second group of frames using the second angular amount of the display device in the second field of view, the second group of frames being fixed as not supporting user navigation.

16. The computing device as described in claim 15, wherein the first field of view differs from the second field of view by an angular extent of the digital content that is made available for viewing by a user's eye by a display device.

17. The computing device as described in claim 15, wherein each frame of the first group of frames consume a larger amount of display area of a display device when rendered than each frame of the second group of frames.

18. The computing device as described in claim 17, wherein the second group of frames have a higher resolution than the first group of frames.

19. The computing device as described in claim 15, wherein each frame of the first group of frames supports viewing, at least partially, when rendered by the display device using peripheral vision of a user whereas each frame of the second group of frames does not support viewing using peripheral vision of a user when rendered by the display device.

20. The computing device as described in claim 15, wherein the display device is configured to support stereoscopic vision.

* * * * *